(12) United States Patent
Harding et al.

(10) Patent No.: US 9,338,363 B1
(45) Date of Patent: May 10, 2016

(54) METHOD AND SYSTEM FOR MAGNIFICATION CORRECTION FROM MULTIPLE FOCUS PLANES

(71) Applicant: General Electric Company, Schenectady, NY (US)

(72) Inventors: Kevin George Harding, Niskayuna, NY (US); Thomas James Batzinger, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 34 days.

(21) Appl. No.: 14/534,837

(22) Filed: Nov. 6, 2014

(51) Int. Cl.
*H04N 5/225* (2006.01)
*H04N 5/232* (2006.01)
*G02B 13/00* (2006.01)
*G02B 13/16* (2006.01)

(52) U.S. Cl.
CPC ........ *H04N 5/23296* (2013.01); *G02B 13/0015* (2013.01); *H04N 5/23212* (2013.01)

(58) Field of Classification Search
CPC .................. H04N 5/23232; G06K 2009/2045; G01L 1/245; G01N 2203/0071; G01M 15/14; G01M 13/00; G01M 5/0033
USPC .............. 348/335–344, 360–361, 218.1, 239, 348/240.1; 382/115–116, 124, 126; 73/760, 73/788, 799, 800
See application file for complete search history.

(56) References Cited

U.S. PATENT DOCUMENTS

| | | | |
|---|---|---|---|
| 1,390,983 A | 9/1921 | Comstock | |
| 3,053,142 A | 9/1962 | Wittel | |
| 3,548,731 A | 12/1970 | Barr et al. | |
| 4,137,459 A | 1/1979 | Albrecht et al. | |
| 4,435,052 A | 3/1984 | Guyton | |
| 4,614,431 A | 9/1986 | Komeyama | |
| 4,999,496 A | 3/1991 | Shaw et al. | |
| 5,309,205 A | 5/1994 | Hayano | |

(Continued)

FOREIGN PATENT DOCUMENTS

| | | |
|---|---|---|
| EP | 1145080 A1 | 10/2001 |
| WO | 9801857 A1 | 1/1998 |
| WO | 0129617 A1 | 4/2001 |

OTHER PUBLICATIONS

Harding, K. et al., "3D Imaging System for Biometric Applications," Proceedings of the SPIE, Three-Dimensional Imaging, Visualization, and Display 2010 and Display Technologies and Applications for Defense, Security, and Avionics IV, 76900J (May 5, 2010), 12 pgs.

(Continued)

*Primary Examiner* — Kelly L Jerabek (74) *Attorney, Agent, or Firm* — Robert M. McCarthy (57) ABSTRACT

A method for correcting a magnification in image measurements is implemented using a computer device including one or more processors coupled to a user interface and one or more memory devices. The method includes acquiring a plurality of images of a target. Each image is acquired at a different distance from the target. The method also includes determining a distance between a lens used in acquiring the plurality of images and the target and determining a magnification of each acquired image. The method further includes determining a magnification correction with respect to a reference, determining a change in a size of the target, and outputting the determined change in a size of the target.

20 Claims, 4 Drawing Sheets

(56) References Cited

U.S. PATENT DOCUMENTS

| | | | |
|---|---|---|---|
| 5,740,505 | A | 4/1998 | Kusumoto et al. |
| 5,870,201 | A | 2/1999 | Bae |
| 6,433,351 | B1 | 8/2002 | Yonekawa |
| 6,493,019 | B1 | 12/2002 | Hirasawa |
| 6,541,283 | B1 | 4/2003 | Leroux |
| 6,667,756 | B2 | 12/2003 | Conrow et al. |
| 6,717,676 | B2 | 4/2004 | Wertheimer et al. |
| 6,833,856 | B2 | 12/2004 | Maeda |
| 6,839,469 | B2 | 1/2005 | Nguyen et al. |
| 7,072,096 | B2 * | 7/2006 | Holman .............. F21S 8/08 257/E25.02 |
| 8,340,456 | B1 * | 12/2012 | DaneshPanah .... H04N 5/23219 348/207.99 |
| 8,610,944 | B2 | 12/2013 | Xu et al. |
| 2003/0174334 | A1 | 9/2003 | Wertheimer et al. |
| 2011/0292227 | A1 * | 12/2011 | Nakazawa ............ G03B 35/10 348/218.1 |
| 2012/0076369 | A1 * | 3/2012 | Abramovich ...... G06K 9/00033 382/124 |
| 2012/0135444 | A1 | 5/2012 | Bernatchez et al. |
| 2012/0166102 | A1 * | 6/2012 | Nieters .............. G01M 5/0016 702/34 |
| 2012/0250947 | A1 * | 10/2012 | Abramovich ...... G06K 9/00026 382/115 |

OTHER PUBLICATIONS

Daneshpanah, M. et al., "Application issues in the use of depth from (de)focus analysis methods," Proc. SPIE 8043, Three-Dimensional Imaging, Visualization, and Display 2011, 80430G (May 20, 2011); 9 pgs.

Liao, Y. et al., "Error Correction for Moiré Based Creep Measurement System," Proc. SPIE 9110, Dimensional Optical Metrology and Inspection for Practical Applications III, 911007 (May 28, 2014); 9 pgs.

* cited by examiner

METHOD AND SYSTEM FOR MAGNIFICATION CORRECTION FROM MULTIPLE FOCUS PLANES

BACKGROUND

The field of the disclosure relates generally to component inspection systems and, more particularly, to an imaging system that takes multiple images of a target to generate a magnification correction used to determine dimensions of the target.

At least some known creep detection systems use a test rig that is positioned to close tolerances for ensuring a repeatability of the creep measurements over time. Set-up time and man-hours is significant because there are typically many components to be inspected.

In some cases, a small mispositioning of a portable camera or a curved surface may make achieving a fixed magnification impossible for a given sensor. Other methods to correct for the magnification in an image used for precision measurements include putting reference targets in the image of a known separation by placing such targets on the part in a manner that they will not change with changes of the part such as due to creep. Targets take up extra space on the part and require a larger image. The alternate approach has been to use a precision mounting system to very accurately position the sensor each time.

BRIEF DESCRIPTION

In one embodiment, an inspection imaging system using magnification correction from multiple focus planes includes an imager including an image acquisition device and a lens. The system also includes a controller including a user interface, one or more memory devices, and one or more processors communicatively coupled to the user interface and the one or more memory devices. The processor is programmed to acquire a plurality of images of a target wherein each image is acquired at a different distance from the target, to determine a distance between a lens used in acquiring the plurality of images and the target, and to determine a magnification of each acquired image. The processor is further programmed to determine a magnification correction with respect to a reference, to determine a change in a size of the target, and to output the determined change in a size of the target.

In another embodiment, a method for correcting a magnification in image measurements includes acquiring a plurality of images of a target, each image acquired at a different distance from the target, determining a distance between a lens used in acquiring the plurality of images and the target, and determining a magnification of each acquired image. The method also includes determining a magnification correction with respect to a reference, determining a change in a size of the target, and outputting the determined change in a size of the target.

In yet another embodiment, one or more non-transitory computer-readable storage media includes computer-executable instructions embodied thereon. When executed by at least one processor, the computer-executable instructions cause the processor to acquire a plurality of images of a target, each image acquired at a different distance from the target, determine a distance between a lens used in acquiring the plurality of images and the target, and determine a magnification of each acquired image. The computer-executable instructions also cause the processor to determine a magnification correction with respect to a reference, determine a change in a size of the target; and output the determined change in a size of the target.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory includes, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with a user interface such as a mouse and a keyboard. Alternatively, other computer peripherals may also be used that may include, for example, but not be limited to, a scanner. Furthermore, in the exemplary embodiment, additional output channels may include, but not be limited to, a user interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Depth from focus/defocus is used for estimating the 3D surface of a scene from a set of two or more images of that scene. The images are obtained by changing the camera parameters (typically the focal setting or the image plane axial position), and taken from the same point of view. The difference between depth from focus and depth from defocus is that, in the first case it is possible to dynamically change the camera parameters during the surface estimation process, while in the second case this is not allowed. In addition, both the problems are called either active or passive depth from focus/defocus, depending on whether it is possible or not to project a structured light onto the scene. While many computer vision techniques estimate 3D surfaces by using images obtained with pin-hole cameras, in depth from defocus we use real aperture cameras. Real aperture cameras have a short depth of field, resulting in images which appear focused only on a small 3D slice of the scene. The image process formation can be explained with optical geometry. The lens is modeled using the thin lens law, i.e. $1/f=(1/v)+(1/u)$, where f is the focal length, u is the distance between the lens plane and the plane in focus in the scene, and v is the distance between the lens plane and the image plane.

In depth from focus, a series of images is taken, each with a shallow depth-of-field. In the simplest form of depth from focus or defocus, information is taken at a large number of images, and the set of images is searched for those images that have the least amount of blur, i.e., the greatest amount of focus clarity. Various embodiments of the present disclosure use this approach to define regions within each image that are in best focus, and combining these regions to build up a single in-focus image.

In depth from defocus, fewer images can be taken, and the degree of defocus is modeled. The amount of defocus blur can be used to estimate how far a particular image feature is from best focus. In this case, the blur is typically modeled as a convolution of the in-focus image and an effective point spread function that can be calculated geometrically from:

$$R=\{D/2\}\times\{1/f-1/o-1/s\} \qquad (1)$$

Figure 1:
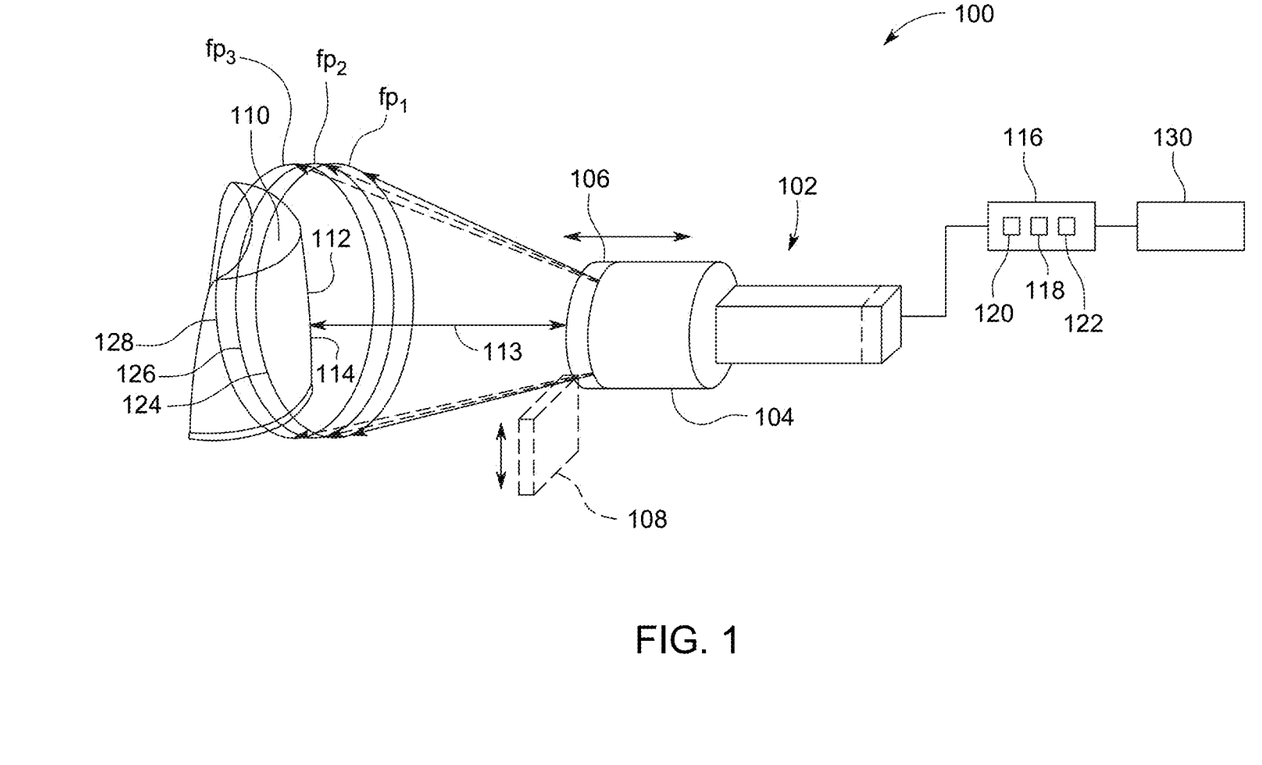
FIG. 1 is a schematic diagram of an exemplary inspection imaging system using magnification correction in accordance with an exemplary embodiment of the present disclosure.

Where, R represents the blur radius, D represents the diameter of the collection aperture, f represents the focal length of lens 106, o represents the object distance to component 110, and s the image distance to imager 102.

Clear edge information is analyzed for focus clarity. For some surfaces, clear edge information may not be available. If a surface does not have inherent features, such as a surface grain structure or other more prominent features that are visible, another approach is needed. An alternative to using the inherent features of an object as a target is to project a pattern, such as lines, onto the surface. The frequency content of the fuzziness can then be modeled around a narrow band of the primary frequency (spacing) of the pattern projected onto the surface of the object. This estimation can be done using a local operator over x and y of the form:

$$S(x,y)=e-(x'^2+y'^2)/2a2\times\cos(2(\pi)/T\times x'+(\phi)) \qquad (2)$$

Where, $x'=x \cos(\theta)-y \sin(\theta)$, $y'=-x \sin(\theta)+y \cos(\theta)$, and T is the primary period of the pattern projected on the subject, a is the standard deviation of the equivalent Gaussian filter, $(\theta)$ the angle of illumination to the surface normal, and $(\phi)$ represents the phase offset.

These approaches assume that the effect of blur is primarily to spread the pattern projected, and to decrease in the rate of change of intensity (derivative of the contrast) of the edges. In some cases, such as auto focus systems, just the contrast of edges is considered in each area. Alternately, the frequency content of the fuzziness is often modeled as a Laplacian calculated around a narrow band of the primary frequency (spacing) of the pattern projected onto the part.

For an imaging system, the depth of focus and the system resolution usually conflict, i.e., the higher the resolution, the smaller the depth over which the imaging system can focus and acquire a clear image. For target detection, both high resolution and high imaging depth are desirable. High resolution is needed for imaging target features like grain structure and surface scratches on a component being inspected.

In one embodiment, as described further below, an imaging system is used to image the target on the component being inspected, using an imaging element, such as a lens, having a set optical path length and focal point. An LCP (liquid crystal panel) and a birefringent optical is positioned between the imaging element and the target to change the optical path length of the imaging system. A birefringent optical element is an element whose optical path length is dependent upon the orientation of the polarization of the light and may be refer to a birefringent window or lens depending on geometry.

This results in two or more optical paths of different lengths, which causes a refocus of the resulting target image. The change in optical path length by the LCP and birefringent optical element has the same effect on the focus/defocus of the image, as would a change in the physical distance between the target and the imaging system. Data from the target images from the focused and refocused optical path lengths are used to calculate a distance to the target from the lens. This may be referred to as a depth from focus or a depth from defocus calculation.

In accordance with one embodiment, as described further below, a method is described in which an LCP and birefringent element is attached to the camera lens and a supplied electronic signal (voltage) is used to control the polarization rotation caused by the liquid crystal. One or more different voltages are applied causing the polarization rotation caused by the LCP to change. Subsequently this causes the light to see a different index of refraction path within the birefringent element resulting in a different optical path length. Any variation in the optical path length results in changes in the focus/defocus on the images similar to a physical change in the distance between the target and the imager.

In each instance the image of the target is acquired using an imager, which is composed of a camera or similar device, which acquires the images of the object and produces the acquired image data on the basis of time or spatial parameters. Similarly the imaging system may include additional components typically found in optical systems such as, but not limited to, additional lens, mirrors, light filters, apertures, illuminating devices, and electronic components.

Various methods exist for generating the focus shifts needed for determining the distance between the target and the lens using an LCP and birefringent elements. In certain embodiments, two to three focal shifts on the order of between about 2 and about 10 millimeters are used. If the depth-of-field (DOF) of the target or surface feature is larger than the focal shift, the images created will have an overlapping focus with the central 'best focus' regions to either side of the overlap area. Depth-of-Field (DOF) is defined as the imaging region through which a given size feature do not appear to change focus. If the DOF is shorter than the path length shift, then each image will show a band of clear focus at different depths on the target.

Using the series of images taken at different distances from the target, with displacements well controlled such that the change is position is known, provides knowledge about how the images change with changes in distance for the particular imaging system, permitting an estimate of the magnification at each location, and a corrected geometry is generated for the calculated in-focus position. In various embodiments, three images are used at three different known standoff distances. In this manner, even if the imaging device is not positioned repeatably each time, the size of the pattern being viewed can be correctly calculated using a reference magnification of known dimensions.

Quickly achieving a desired magnification to a high degree of accuracy can be very difficult, especially if viewing some feature or target using a hand held device. In some cases, a curved surface may make achieving a fixed magnification impossible for a given imager. This method allows the images to be used to calculate the correct geometry of the target without excessive fixtures or other methods to manually achieve a reference image magnification. In the case of measuring creep by means of viewing small changes in a two-dimensional (2D) target with a portable camera device, this method permits a higher degree of repeatability of the measurement.

Embodiments of the magnification correction systems described herein provide a cost-effective method for measuring a change in target dimensions to determine an amount of creep a component is experiencing. The embodiments described herein use an imaging system to provide real-time information of the creep in a component. Specifically, the embodiments described herein use an imager and processing functions to determine a distance to the component and a magnification of the target in multiple images. A correction is determined for magnification differences due to the distance changes between images. When the corrections applied to the target image, the dimensions of the target can be determined. Therefore, the embodiments described herein substantially reduce the setup time for measuring creep in components, thereby reducing the costs of maintenance. In addition, the creep measurements are consistent over time.

FIG. 1 is a schematic diagram of an inspection imaging system 100 including magnification correction in accordance with an exemplary embodiment of the present disclosure. In the exemplary embodiment, inspection imaging system 100 includes an imager 102 that is configured to be able to shift its focus position ($fp_1$, $fp_2$, $fp_3$). In various embodiments, imager 102 includes an image acquisition device 104, a lens 106, and in some embodiments, an optical path changer 108, for example, but not limited to, a birefringent element or a glass member. Imager 102 is able to shift its focus position using at least one of optical path changer 108 and a positioning mount (not shown) configured to translate at least one of imager 102 and a component 110 including a target 112 towards or away from each other. Translating imager 102 or component 110 towards or away from each other changes a distance 113 between them. Distance 113 is used for determining a magnification of target 112 at each focus position. Target 112 is embodied in a pattern coupled to or etched into a surface 114 of component 110 or is embodied in a feature of surface 114, such as, but not limited to, a hole, a groove, a slot, a protuberance, and combinations thereof that adds relief to surface 114.

Inspection imaging system 100 includes a controller 116 configured to coordinate the operation of inspection imaging system 100. Controller 116 coordinates the acquisition of images and the positioning of imager 102 and component 110 with respect to each other. Controller 116 includes one or more processors 118 coupled to a user interface 120 and one or more memory devices 122.

In operation, controller 116 retrieves from one or more memory devices 122 instructions that when executed by one or more processors 118 instruct one or more processors 118 to establish initial parameters for acquiring multiple images of target 112, each image acquired at a different focal position. For example, controller 116 initiates the acquisition of a first image at a first focal position 124, a second image at a second focal position 126, and a third image at a third focal position 128. The acquired images are transmitted to controller 116 where they are processed immediately and/or stored for later use.

Figure 2:
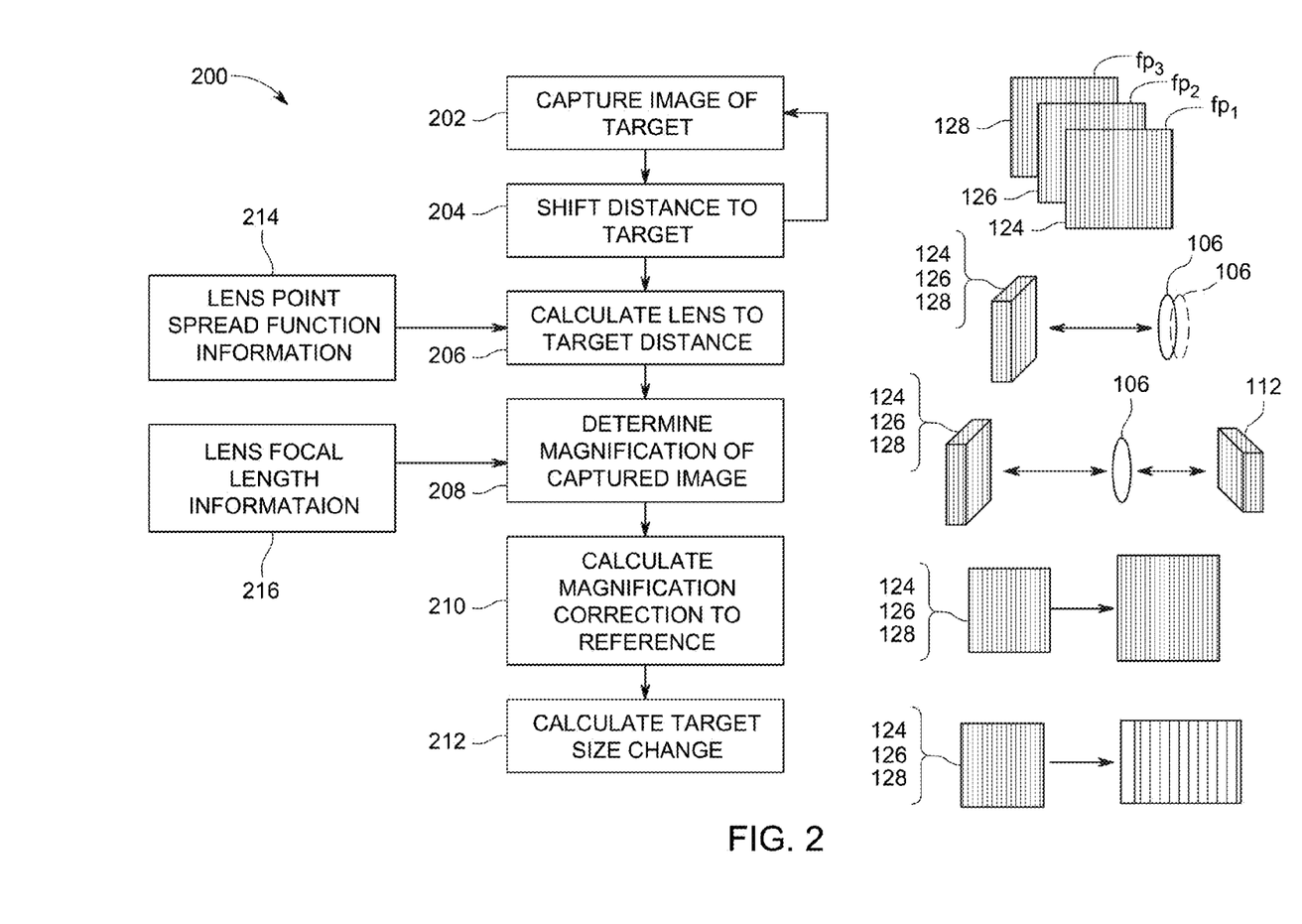
FIG. 2 is a flow chart of an exemplary method of correcting a magnification of images of a target using multiple focus planes.

FIG. 2 is a flow chart of a method 200 of correcting a magnification of images of a target using multiple focus planes. As used herein, a focus plane or plane of focus (PoF) is an imaginary two dimensional plane in front of the camera or imager 22 at the point of focus. The PoF represents the theoretical plane of sharpest focus and lies in the depth of field. The PoF lies parallel to the sensor (and perpendicular to the optical axis) of the camera or imager 22. Multiple focus planes refers to a plurality of images, each acquired at a different distance between the sensor and the target. Multiple focus planes also refers to a plurality of images, each acquired at a different distance between the sensor and the target using the same optical parameters for each image (except the distance between the sensor and the target). In the exemplary embodiment, method 200 includes acquiring 202 a plurality of images of a target. Each image of the target is acquired at a different distance from the target. Method 200 also includes determining 204 a distance between a lens used in acquiring the plurality of images and the target. Method 200 further includes determining 206 a magnification of each acquired image, determining 208 a magnification correction with respect to a reference target having known or calculable dimensions, determining 210 a change in a size of the target, and outputting 212 the determined change in a size of the target to a computer system 130. In one embodiment, the determined change in a size of the target is output to a maintenance planning computer system communicatively coupled to the inspection imaging system. In various embodiments, the determined change in a size of the target is output to a rate computer system configured to determine a rate of change of the target and to forecast a time period before the target exceeds a predetermined limit.

Imager 102 (shown in FIG. 1) is used to acquire images of target 112. The images are usually visual images acquired in the visual wavelength of light. In various embodiments, other wavelengths, such as, the infrared band of wavelengths is used to acquire the images. After acquiring 202 each image, the optical path distance between imager 102 and target 112 (shown in FIG. 1) is changed to acquire the next image at a different focus plane. Imager 102 is not focused at each optical path distance, but rather the focus clarity or fuzziness of the edges of target 112 is used to determine a distance between imager 102 and target 112. Additionally, other optical parameters of imager 102 are not adjusted between acquisitions of the images. In some embodiments, one of the acquired images is at a best focus position having relatively crisp sharp lines. In other embodiments, the images are acquired at different distance 113 are not at best focus and have some fuzzy edges. A prediction of the distance between imager 102 and target 112 is made based on the degree called fuzziness, or degree of clarity of those edges. A function that describes that change relates to a point spread function or other focus based functions.

Using the focus clarity to determine a distance between imager 102 and target 112 obviates the need for complicated and time-consuming alignment of component 110 in a test rig to reproduce an initial image acquisition for comparison of changes in size of target 112. Lens point spread information 214 is used in determining 204 the distance between lens 106 (shown in FIG. 1) used in acquiring the plurality of images and target 112.

Because changing distance 113 (shown in FIG. 1) from lens 106 to target 112 also changes the magnification of target 112 (target 106 looks bigger for closer distance images and smaller for farther distance images), a magnification is determined 206 for each acquired image using focal length information 216 for lens 106. A change in magnification from image to image is determined using distance 113 and focal length information 216. A magnification correction with respect to a reference target is also determined 208. Using the corrected magnification, a change in a size of the target is determined 210. Comparing a currently determined target size to a previously determined target size is performed in controller 116 or controller 116 offloads such tasks to other components (not shown). In various embodiments, the images and/or results of the determinations are output 212 to a user (not shown) on user interface 120 or to a maintenance computer system that may include a maintenance planning computer system or a rate computer system. In various embodiments, the maintenance planning and rate determination function of the rate computer system may be performed by separate computers or the functions may be incorporated into a portion of controller 116.

Figure 3:
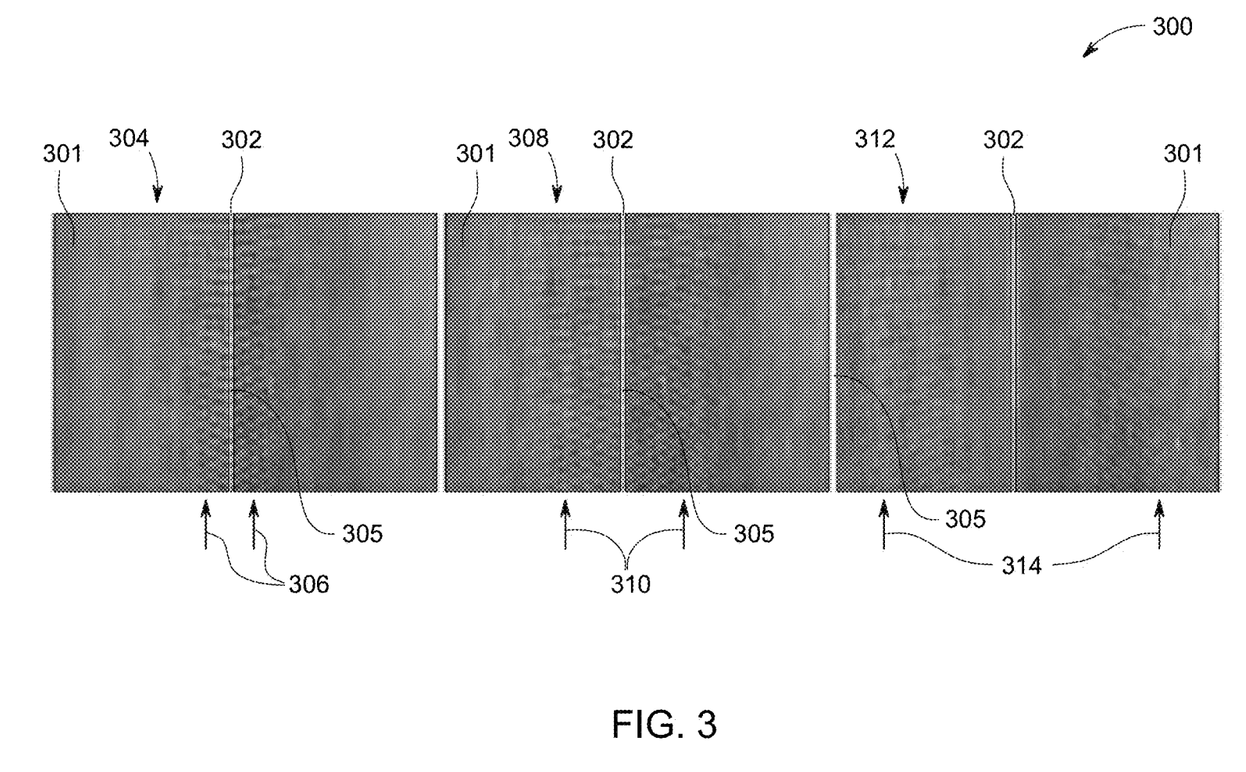
FIG. 3 is an example of focus depth changes for a focus-based determination based on three images of a component taken at different focus depths using the method shown in FIG. 2.
Figure 4:
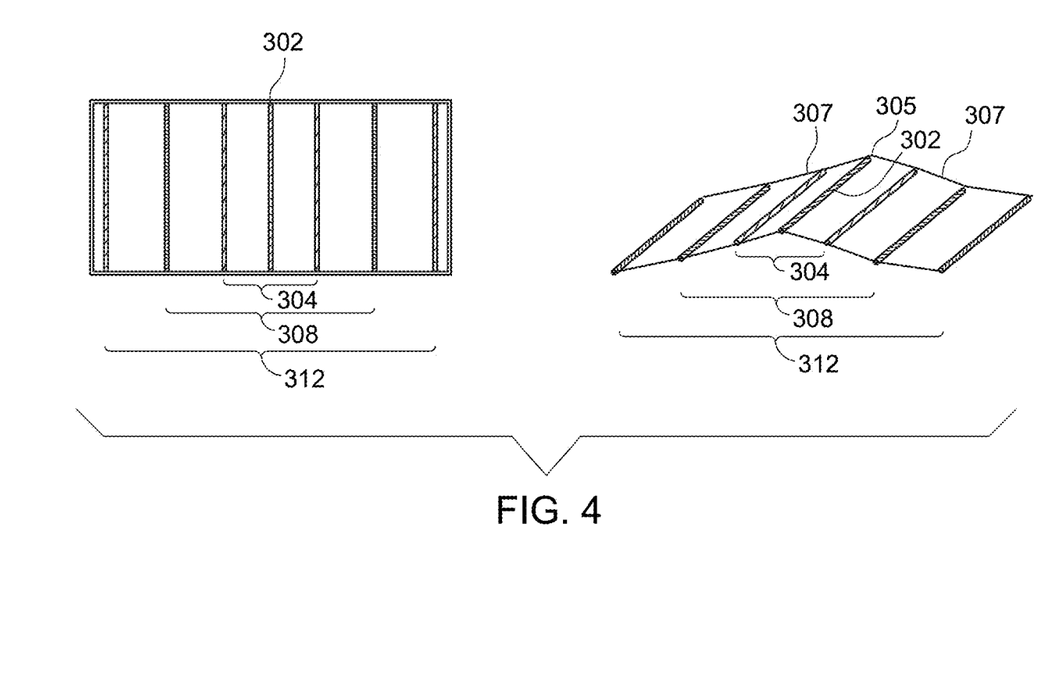
FIG. 4 is a perspective view of the component 301 shown in FIG. 3.

FIG. 3 is an example of focus depth changes for a focus-based determination based on three images 300 of a component 301 taken at different focus depths. FIG. 4 is a perspective view of component 301 (shown in FIG. 3). The exemplary embodiment uses multiple images acquired at different focal depths or focus positions in a depth-from-defocus (DFD) method using a configuration as shown in FIG. 1. DFD lends itself well to portable measurements for components where edges and features are visible and common enough on the component to be used as a means of creating image data in the regions of such features. DFD has not been widely used in industrial measurements, as it does rely on clear local features, and as such does not apply as well to smooth, clean surfaces.

In a depth from focus determination, one way of providing information is to take a set of images that includes a larger number of images and search through an area within each that has the least amount of blur. In one embodiment, this approach is used to define regions within each image that is best focused and then combine those regions to build up a single, in-focus image or determine a distance to imager 102.

In this embodiment, a simple corner 302 includes a target, such as, lines (which can be texture on the part or projected lines). A region over which each image is seen as being in clear focus is marked on the graphic with heavy arrows. In a first image 304 covering an apex 305 of corner 302 and extending part way down a slope 307, arrows 306 point to an in-focus portion of image 304. In a second image 308 covering apex 305 and extending part way down slope 307, arrows 310 point to an in-focus portion of image 308. In a third image 312 covering apex 305 and extending part way down slope 307, arrows 314 point to an in-focus portion of image 312.

The above described inspection imaging system with magnification correction provides a cost-effective method for measuring a change in target dimensions to determine an amount of creep a component is experiencing. The embodiments described herein use an imaging system to provide real-time information of the creep in a component. Specifically, the embodiments described herein use an imager and processing functions to determine a distance to the component and a magnification of the target in multiple images. A correction is determined for magnification differences due to the distance changes between images. When the correction is applied to the target image, the dimensions of the target can be determined. Therefore, the embodiments described herein substantially reduce the setup time for measuring creep in components, thereby reducing the costs of maintenance. In addition, the creep measurements are consistent over time.

An exemplary technical effect of the methods, systems, and apparatus described herein includes at least one of: (a) using an imager to acquire multiple images of a target, each image acquired from a different distance from the target; (b) using a focus clarity of the target in the images to determine the distance from the target; and (c) determining a magnification and a correction to the magnification of the image at each distance.

Although specific features of various embodiments of the disclosure are shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC)

processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An inspection imaging system configured to use magnification correction from multiple focus planes, said system comprising:
    an imager comprising an image acquisition device and a lens in optical communication with said image acquisition device;
    a controller comprising:
        a user interface;
        one or more memory devices; and
        one or more processors communicatively coupled to said user interface and said one or more memory devices, said one or more processors programmed to:
            acquire a plurality of images of a target, each image of the plurality of images acquired in a different focus plane of the multiple focus planes with respect to the target using the same optical parameters of the imager for each image;
            determine a distance between said lens used in acquiring the plurality of images and the target;
            determine a magnification of each acquired image;
            determine a magnification correction with respect to a reference target of known dimensions;
            determine a change in a size of the target; and
            output the determined change in the size of the target to a maintenance planning computer system communicatively coupled to the inspection imaging system.

2. The system of claim 1, further comprising an optical path changer configured to change the optical path of light between the target and said lens.

3. The system of claim 1, wherein said processor is further programmed to receive point spread function information for said lens for determining the distance between said lens and the target.

4. The system of claim 1, wherein said processor is further programmed to determine a magnification of each acquired image using focal length information of said lens.

5. The system of claim 1, wherein said processor is further programmed to determine the distance between said lens and the target using a focus clarity of the image.

6. The system of claim 1, wherein said processor is further programmed to determine the distance between said lens and the target using at least one of a depth from focus function and a depth from defocus function.

7. A computer-implemented method for correcting a magnification in image measurements, said method implemented using a computer device including one or more processors coupled to a user interface and one or more memory devices, said method comprising:
    acquiring a plurality of images of a target, each image of the plurality of images acquired at a different distance from the target;
    determining a distance between a lens used in acquiring the plurality of images and the target;
    determining a magnification of each acquired image;
    determining a magnification correction with respect to a reference;
    determining a change in a size of the target; and
    outputting the determined change in a size of the target to a maintenance planning computer system.

8. The method of claim 7, wherein determining a distance between the lens used in acquiring the plurality of images and the target comprises receiving point spread function information for the lens.

9. The method of claim 7, wherein determining a magnification of each acquired image comprises determining a magnification of each acquired image using focal length information of the lens.

10. The method of claim 7, wherein acquiring the plurality of images of the target comprises acquiring a plurality of images of a pattern coupled to a surface of a component.

11. The method of claim 7, wherein acquiring the plurality of images of the target comprises acquiring a plurality of images of a surface feature of a component.

12. The method of claim 7, wherein determining a distance between the lens used in acquiring the plurality of images and the target comprises determining the distance between the lens and the target using a focus clarity of the image.

13. The method of claim 7, wherein determining a distance between the lens used in acquiring the plurality of images and the target comprises determining the distance between the lens and the target using at least one of a depth from focus function and a depth from defocus function.

14. The method of claim 7, wherein determining a distance between the lens used in acquiring the plurality of images and the target comprises acquiring a first of the plurality of images in focus.

15. The method of claim 14, wherein determining a distance between the lens used in acquiring the plurality of images and the target comprises acquiring a remainder of the plurality of images out of focus.

16. One or more non-transitory computer-readable storage media having computer-executable instructions embodied thereon, wherein when executed by at least one processor, the computer-executable instructions cause the processor to:
    acquire a plurality of images of a target, each image of the plurality of images acquired at a different distance from the target;
    determine a distance between a lens used in acquiring the plurality of images and the target;
    determine a magnification of each acquired image;
    determine a magnification correction with respect to a reference;
    determine a change in a size of the target; and
    output the determined change in a size of the target to a rate computer system configured to determine a rate of change of the target and to forecast a time period before the target exceeds a predetermined limit.

17. The computer-readable storage media of claim 16, wherein the computer-executable instructions further cause the at least one processor to determine the distance between the lens and the target using a focus clarity of the image.

18. The computer-readable storage media of claim 16, wherein the computer-executable instructions further cause the at least one processor to determine the distance between the lens and the target using at least one of a depth from focus function and a depth from defocus function.

19. The computer-readable storage media of claim 16, wherein the computer-executable instructions further cause the at least one processor to acquire a first of the plurality of images in focus.

20. The computer-readable storage media of claim 19, wherein the computer-executable instructions further cause the at least one processor to acquire a remainder of the plurality of images out of focus.

\* \* \* \* \*